US008171116B2

(12) United States Patent  
Pichetti et al.

(10) Patent No.: US 8,171,116 B2  
(45) Date of Patent: May 1, 2012

(54) CONFIGURING PROCESSING ENTITIES ACCORDING TO THEIR ROLES IN A DATA PROCESSING SYSTEM WITH A DISTRIBUTED ARCHITECTURE

(75) Inventors: Luigi Pichetti, Rome (IT); Antonio Secomandi, Milan (IT); Roberto Ranucci, Contigliano (IT); Claudio Marinelli, Aprilia (IT); Francesco Lupini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/128,944

(22) Filed: May 29, 2008

(65) Prior Publication Data

US 2008/0228902 A1    Sep. 18, 2008

Related U.S. Application Data

(63) Continuation of application No. 10/671,062, filed on Sep. 25, 2003, now abandoned.

(30) Foreign Application Priority Data

Dec. 11, 2002   (FR) .................................. 02 027753

(51) Int. Cl.
G06F 15/177   (2006.01)
G06F 9/445   (2006.01)
G06F 15/16   (2006.01)
(52) U.S. Cl. ........ 709/220; 709/221; 709/227; 717/168; 717/174; 717/177
(58) Field of Classification Search .................. 709/200, 709/220, 227; 718/100, 200, 220; 717/168, 717/174, 177
See application file for complete search history.

(56) References Cited

U.S. PATENT DOCUMENTS

| | | | |
|---|---|---|---|
| 5,581,764 A * | 12/1996 | Fitzgerald et al. | 709/223 |
| 5,845,090 A | 12/1998 | Collins, III et al. | |
| 5,953,533 A * | 9/1999 | Fink et al. | 717/175 |
| 5,960,189 A * | 9/1999 | Stupek et al. | 717/169 |
| 5,999,740 A * | 12/1999 | Rowley | 717/173 |
| 6,038,586 A | 3/2000 | Frye | |
| 6,199,204 B1 * | 3/2001 | Donohue | 717/178 |
| 6,237,020 B1 * | 5/2001 | Leymann et al. | 709/201 |

(Continued)

OTHER PUBLICATIONS

"State Driven Software Installation for Windows NT", Martin Sjolin, 2nd Large Installation System Administration of Windows NT Conference, Jul. 14-17, 1999.*

*Primary Examiner* — Ashok Patel  
*Assistant Examiner* — Linglan Edwards  
(74) *Attorney, Agent, or Firm* — Stephen J. Walder, Jr.; Jeffrey S. LaBaw

(57) ABSTRACT

A mechanism is provided for configuring different computers of a network. Each computer plays a specific physic role (defined by an architecture of the network) and/or a specific logic role (defined by the applications running in the network). A reference model and a transition table are associated with each product to be installed in the network; the reference model specifies a target configuration for each role (defined by the components of the product to be installed), while the transition table specifies the actions required to reach each target configuration from each current configuration of the computers. A server identifies the role and the current configuration of each computer; the actions required to enforce the desired target configuration on the computer are then established and executed.

22 Claims, 5 Drawing Sheets

U.S. PATENT DOCUMENTS

| | | |
|---|---|---|
| 7,024,450 B1 * | 4/2006 | Deo et al. .................. 709/203 |
| 7,254,631 B2 | 8/2007 | Crudele et al. |
| 2002/0100036 A1 * | 7/2002 | Moshir et al. ............... 717/173 |
| 2002/0129356 A1 * | 9/2002 | Hellerstein et al. .......... 717/177 |
| 2002/0133814 A1 * | 9/2002 | Bourke-Dunphy et al. .. 717/174 |
| 2002/0144248 A1 * | 10/2002 | Forbes et al. ............... 717/167 |

* cited by examiner

CONFIGURING PROCESSING ENTITIES ACCORDING TO THEIR ROLES IN A DATA PROCESSING SYSTEM WITH A DISTRIBUTED ARCHITECTURE

This application is a continuation of application Ser. No. 10/671,062, filed Sep. 25, 2003, status pending.

TECHNICAL FIELD

The present invention relates to the data processing field, and more specifically to a method and a corresponding system for configuring processing entities according to their roles in a data processing system with a distributed architecture.

BACKGROUND ART

Managing configuration changes in a data processing system with a distributed architecture is a time consuming activity, particularly when the system includes a high number of processing entities on which new configurations must be enforced. A typical example is that of a large network with thousands of computers, where software products are periodically upgraded in order to be abreast of the information technology development.

Software distribution applications have been proposed in the last years to assist a system administrator in efficiently managing deployment of software products from a central site of the network. A software distribution application controls building of packages, which include instructions specifying the actions to be carried out on target computers for installing or removing selected software products; each package further embeds a copy of the software products to be installed. The package is transmitted to the computers, and the corresponding instructions are interpreted so as to enforce the desired software configuration.

However, this solution is not completely satisfactory. Particularly, the administrator is faced with the burden of manually defining the packages to be distributed to the computers. As a consequence, the process of managing the configuration changes is complex and error-prone, particularly if the network includes a high number of computers.

The drawbacks of the solutions known in the art are more acute when the configuration process involves a software application that is distributed across the network. Typically, the distributed application includes different software components for corresponding computers of the network. As a consequence, the task of installing and upgrading the distributed application is very difficult (because of the need to tackle the problem as a whole, without the possibility of addressing a single computer at the time). A typical example is that of a software infrastructure used to manage several aspects of the life cycle of the network itself.

The above-described problems are exacerbated when multiple products are shipped as a single suite; moreover, additional difficulties arise when the network has a complex topology.

SUMMARY OF THE INVENTION

It is an object of the present invention to provide a method of configuring the entities of the data processing system according to their roles played in the system.

It is another object of the present invention to simplify the configuration of the system.

It is yet another object of the present invention to provide a mechanism that is well suited to install and upgrade distributed applications, particularly when the applications include multiple products.

Moreover, it is an object of the present invention to support the configuration of data processing systems with a complex topology.

The accomplishment of these and other related objects is achieved, in a data processing system with a distributed architecture including a plurality of processing entities, each entity playing at least one of a plurality of predetermined roles in the system, by a method of configuring the entities including the steps of: defining a target configuration for each role, identifying the at least one role of each entity, and configuring each entity according to the target configuration corresponding to the at least one role of the entity.

The present invention also provides different computer program applications for performing the method, and respective products storing the program applications.

Moreover, a corresponding data processing system and a server computer for use in the system are encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1A:
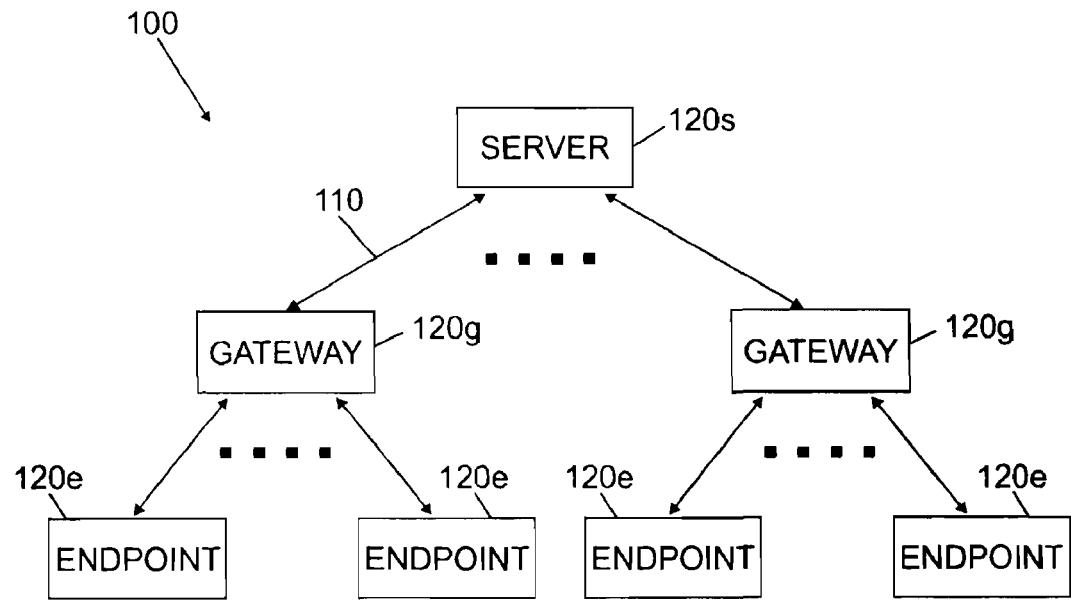
FIG. 1a is a schematic block diagram of a data processing system in which the method of the invention can be used.

With reference in particular to FIG. 1a, a data processing system 100 with a distributed architecture is shown. The system 100 consists of a network of computers; the computers are interconnected through an infrastructure 110 (for example, based on a Local Area Network, or LAN), according to a pattern defining a topology of the network 100.

Each computer plays a specific physic role in the network 100; the physic role of the computer depends on the architecture of the network 100. For example, in a Tivoli Management Environment (TME), the network 100 implements an independent region (referred to as Tivoli Management Region, or TMR). The region has a three-tier structure. A TMR server 120s manages the whole region from a central site. The server 120s communicates with several gateways, or Managed Nodes (MN), 120g. The gateways 120g bridge between the server 120s and corresponding clusters of endpoints 120e. Each endpoint 120e defines a target of management actions enforced by the server 120s.

Moreover, each computer (generically denoted with 120) may also play different logic roles specific for applications running in the network 100. For example, in a software distribution process a computer is configured to be a Source Host (SH), which operates as a preparation and testing central site for software products to be deployed throughout the network 100.

Figure 1B:
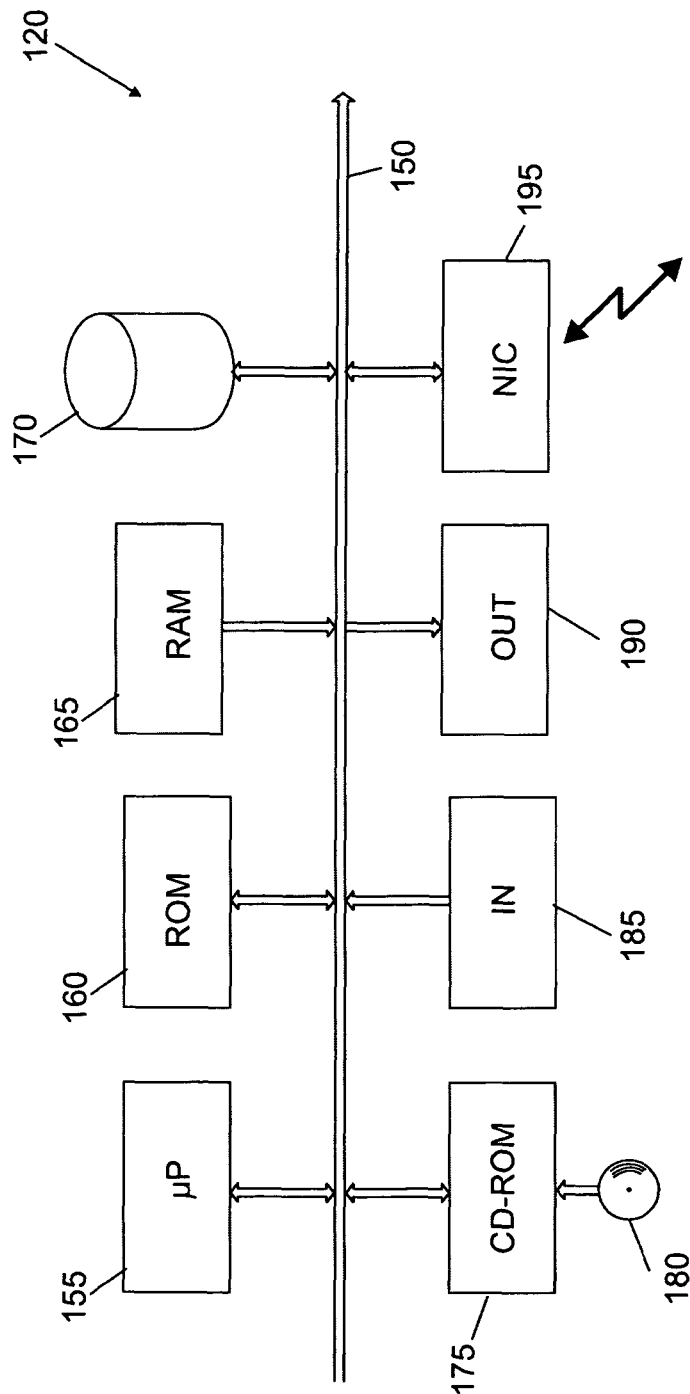
FIG. 1b shows the functional blocks of a generic computer of the system.

A shown in FIG. 1b, a generic computer 120 (server, gateway or endpoint) is formed by several units that are connected in parallel to a communication bus 150. In detail, a microprocessor (μP) 155 controls operation of the computer 120, a Read Only Memory (ROM) 160 stores basic code for a bootstrap of the computer 120, and a Random Access Memory (RAM) 165 is directly used as a working memory by the microprocessor 155. Several peripheral units are further connected to the bus 150 (by means of respective interfaces). Particularly, a mass memory consists of a magnetic hard-disk 170 and a unit 175 for reading CD-ROMs 180. Moreover, the computer 120 includes input devices 185 (for example, a keyboard and a mouse), and output devices 190 (for example, a monitor and a printer). A network Interface Card (NIC) 195 is used to connect the computer in the network.

However, the concepts of the present invention are also applicable when the network has a different topology, when the computers are interconnected in another way (for example, through the Internet), or when the network is replaced with an equivalent data processing system with a distributed architecture. Similar considerations apply if the system includes different logic and/or physic entities (such laptops, Personal Digital Assistants (PDAs), mobile telephones, or virtual machines), if the computers have a different structure or include other units. Alternatively, different physic and/or logic roles are envisaged; for example, a computer may operate as a firewall, as a collector of results in an inventory application, and so on.

Figure 2:
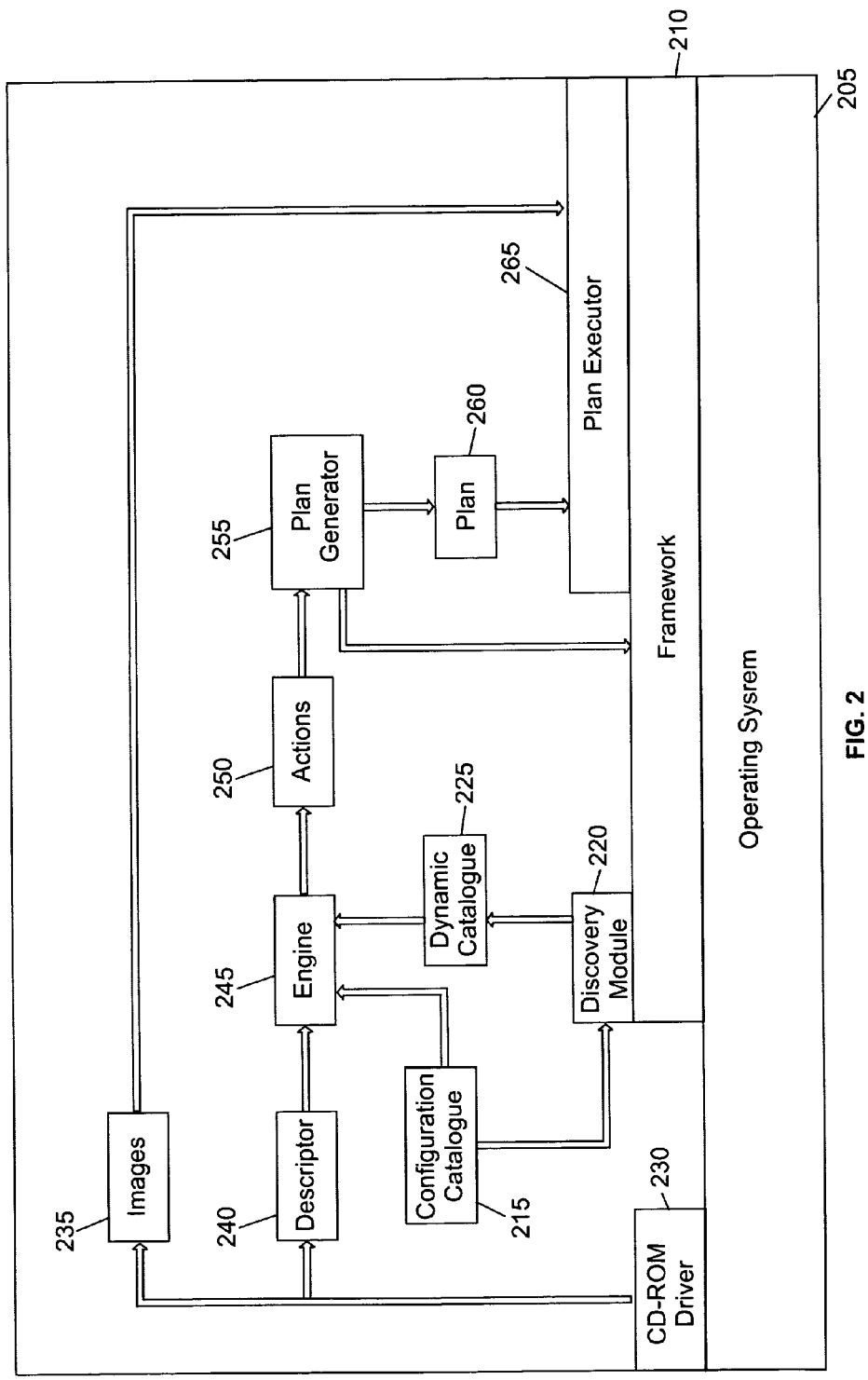
FIG. 2 depicts the main software components used for implementing the method.

Considering now FIG. 2, a partial content of the working memory of the server in operation is shown. The information (programs and data) is typically stored on the hard-disk and loaded (at least partially) into the working memory when the programs are running. The programs are initially installed onto the hard-disk from CD-ROM.

An operating system 205 provides a software platform for the server, on top of which other programs can run. A Tivoli Management Framework (TMF) 210 is installed over the operating system 205; the framework 210 defines a software infrastructure that is common to the whole region.

A catalogue 215 specifies a current software configuration of all the computers of the network. For each computer, the configuration catalogue 215 stores a name of its physic role and an inventory of the different software components of the products installed on the computer. The physic role of the computer is set at installation time; the software inventory is updated whenever the software components are installed and/or upgraded on the computer.

The configuration catalogue 215 is accessed by a discovery module 220. The discovery module 220 detects a current level of the framework installed on every computer (exploiting corresponding network services). The discovery module 220 generates a further catalogue 225 dynamically. For each computer, the dynamic catalogue 225 stores the level of the framework and the name of its logic role. The logic role is identified according to the software components installed on the computer; for example, the presence of a module SPEditor makes it possible to classify the computer as a source host in a software distribution application.

A driver 230 controls the unit for reading CD-ROMs. The driver 230 is used to upload information relating to software products to be installed in the network (provided on one or more CD-ROMs). For example, the process of the invention is used to install a Tivoli Deployment Suite consisting of a Change Configuration Management (CCM) product, an Application Performance Management (APM) product, a Tivoli Resource Manager (TRM) product, a Software Distribution (SWD) product, and an Inventory (INV) product.

Each product is provided with a set of images of the different components to be installed on corresponding categories of computers (defined according to their physic and/or logic roles); the images uploaded from the CD-ROMs are stored in a repository 235. Moreover, the product is provided with a file 240 (for example, in the XML format), which describes how to use the different images of the product. The descriptor 240 includes a first section specifying a reference model for the product; for each (physic and logic) role, the reference model includes the name of the component(s) that must be installed on the computers playing that role. Moreover, the descriptor 240 includes another section specifying a transition table for installing the product; for each pair current state/target state of a generic component of the product, the transition table stores an indication of one or more actions required to reach the target state from the current state; an error code is instead specified when the transition from the current state to the target state is not supported.

For example, the transition table specifies that the target state of the component requires its fresh installation (when no previous version of the component is available) or an upgrade (when a former, upgradeable version of the component is already installed); conversely, an error is specified when a direct migration from a very old level of the component to a latest level thereof is not possible. More specifically, let us consider a product including the components COMP1_v.4.1, COMP2_v.3.0, COMP3_v.2.5, and COMP4_v.2.3. The reference model specifying the target states for the generic roles ROLE1, ROLE2 and ROLE3 is:

| Role  | Targ t state              |
|-------|---------------------------|
| ROLE1 | COMP1_v.4.1               |
| ROLE2 | COMP3_v.2.5, COMP4_v.2.3  |
| ROLE3 | COMP2_v.3.0               |

The descriptor of the product also includes the following transition table:

| Target state | Current state | Actions |
|--------------|---------------|---------|
| COMP1_v.4.1  | N/A           | Install COMP1_v.4.1 |
|              | COMP1_v.4.0   | Upgrade to COMP1_v.4.1 |
|              | COMP1_v.1-    | Error |
|              | COMP1_v.3     | |
| COMP2_v.3.0  | N/A           | Install COMP2_v.3.0 |
|              | COMP2_v.2     | Upgrade to COMP1_v.3.0 |
|              | COMP2_v.1     | Error |
| COMP3_v.2.5  | N/A           | Install COMP3_v.2.5 |
|              | COMP3_v.2.0-  | Upgrade to COMP3_v.2.5 |
|              | COMP3_v.2.4   | |
|              | COMP3_v.1     | Error |
| COMP4_v.2.3  | N/A           | Install COMP4_v.2.3 |
|              | COMP4_v.2.0-  | Upgrade to COMP4_v.2.3 |
|              | COMP4_v.2.2.  | |
|              | COMP4_v.1     | Error |

For example, if the product must be installed on a computer playing the role ROLE3 and wherein the component COMP2_v.2 is already installed, the action "Upgrade to COMP2_v.3.0 " must be executed to reach the desired target state.

The configuration catalogue 215, the dynamic catalogue 225, and the descriptor 240 are input to a differencing engine 245. The engine 245 generates a list of actions 250 for enforcing a desired target configuration in the network (as defined in the reference model of the descriptor 240). For each computer, the action list 250 stores one or more records specifying the names of the components to be installed and the actions to be executed for installing the components starting from their current states on the computer. The actions are ordered into a correct sequence; for example, the sequence ensures the interoperability in the network (installing the different products in a top-down order beginning from the server) and the required dependencies among the products.

The action list 250 is supplied to a plan generator 255. The plan generator 255 exploits the framework 210 for executing some of the actions synchronously. The other actions are chained into one or more plans 260, each one scheduled at a desired time. A module 265 controls the execution of the plans 260 (exploiting the framework 210). For this purpose, the plan executor 265 transmits the list of actions (extracted from each plan 260) and the images of the corresponding components (imported from the repository 235) to the relevant computers.

However, the concepts of the present invention are also applicable when the whole application for configuring the network has another structure, when different products must be installed on the computers, or when the current configuration of the computers is detected in another way (for example, only during the configuration process or only dynamically). Similar considerations apply if the products with the corresponding descriptors are provided in a different manner (for example, they are downloaded from a web site of the publisher), if the descriptor has another format, if the actions required to enforce the desired target configuration in the network are executed in a different way, and the like. For example, every computer retrieves the images of the components to be installed from depots distributed across the network; alternatively, the computer accesses the web site of the publisher and then downloads the images directly.

Figure 3A:
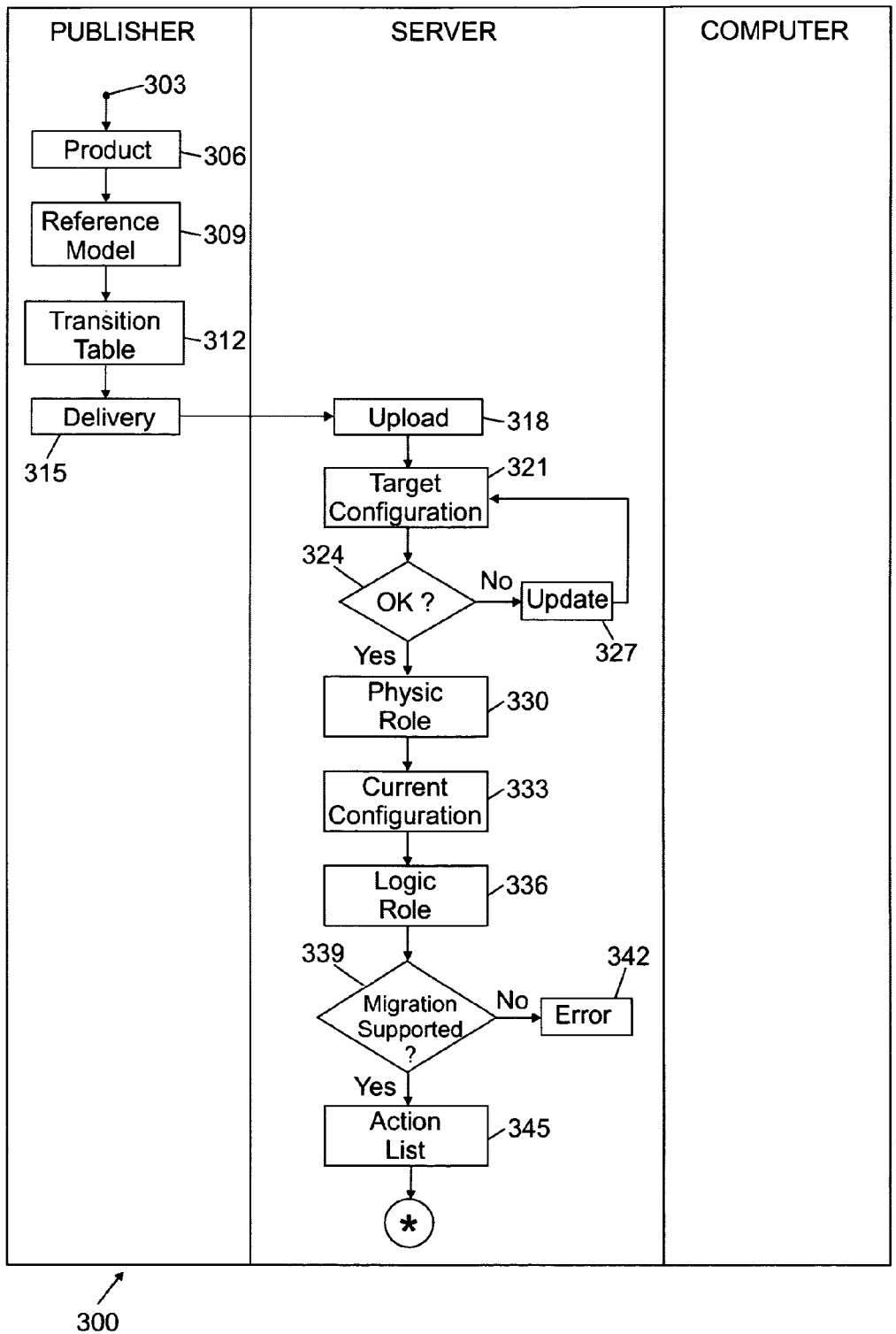
FIGS. 3a-3b is an activity diagram describing the flow of the method.
Figure 3B:
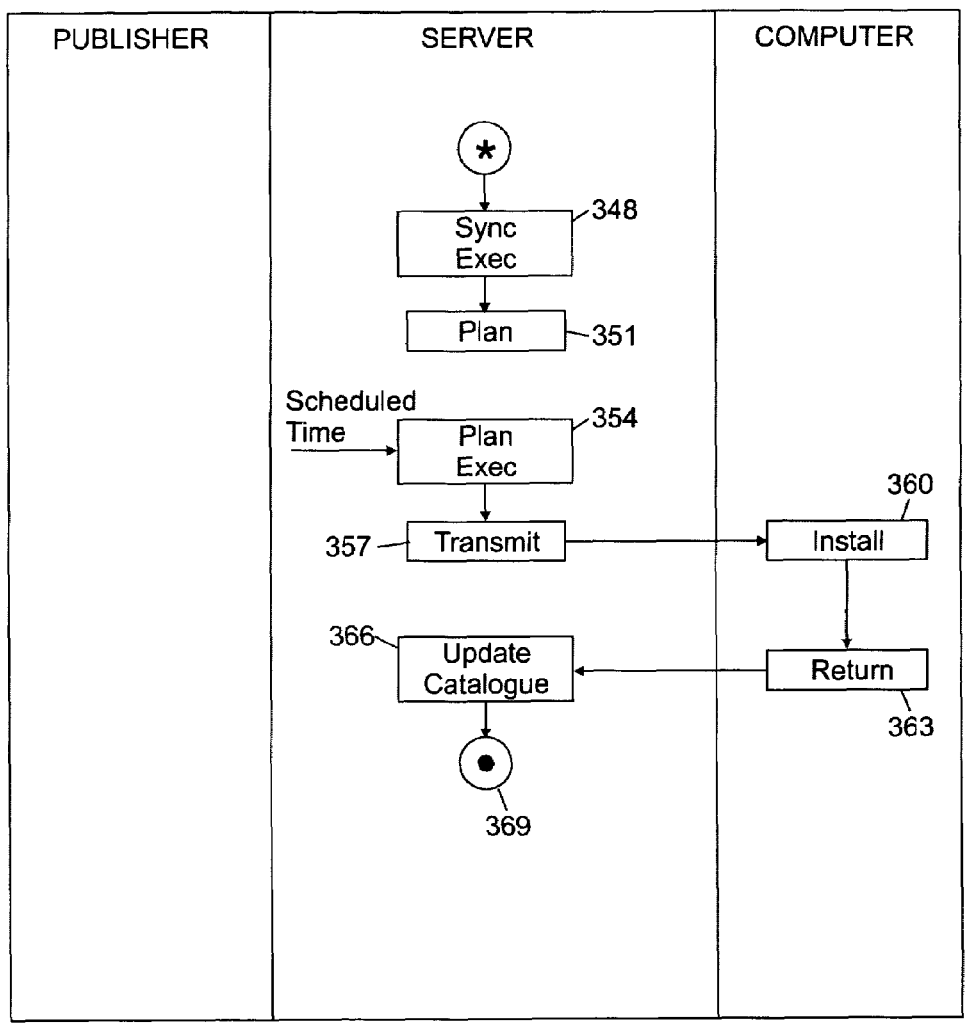

As shown in the activity diagram of FIGS. 3a-3b, a process 300 of configuring the network described above begins at the black start circle 303 in the swim-lane of the publisher. Continuing to block 306, a new suite of products is made available. At the same time, the publisher defines the corresponding reference models at block 309, and the corresponding transition tables at block 312. The suite of products with their descriptors is then delivered to the server at block 315.

Considering now block 318 in the swim-lane of the server, the images of the products and the corresponding descriptors are uploaded onto the hard-disk. The installation of the products is typically guided by a wizard developed in the Install Shield Multi-Platform (ISMP) environment. Particularly, at block 321 a panel prompts a system administrator to select the desired products to be installed (with the framework and the plan executor that are mandatory); for every product, the target state for each role (specifying the components to be installed) may be displayed. If the proposed choices are not accepted at block 324, the target configuration of the network may be updated at block 327; the process then returns to block 321.

Conversely, as soon as the system administrator confirms the target configuration the process descends into block 330; the physic role of every computer is then identified (from the configuration catalogue). Continuing to block 333, the current configuration of every computer is detected (retrieving the information relating to the level of the respective frameworks dynamically and the information relating to the other components installed on the computer from the configuration catalogue). The computers are then classified at block 336 in the logic role corresponding to the components installed thereon.

As soon as the above-described discovery process has been completed, the flow of activity descends into block 339; for each (physic and/or logic) role of every computer, the desired target state is extracted from the reference model; the entry of the transition table associated with the pair current state/target state in then identified. If a migration is not allowed from the current state to the target state, an error condition is entered at block 342. Conversely, the list of actions required to reach the target state from the current state on the computer is generated at block 345.

Some of the actions resulting from this differencing process are executed synchronously at block 348 under the control of the plan generator (for example, a first installation of the framework or the configuration application running on the server is performed directly). The process then passes to block 351, wherein one or more plans for enforcing the other actions are created and scheduled for execution.

As soon as the scheduled time of a generic plan is reached, the execution of the plan is started at block 354. Continuing to block 357, the list of actions and the corresponding images are transmitted to the relevant computers of the network. In response thereto, an agent running on a generic computer installs the desired components at block 360. Passing to block 363, the result of the installation operation is returned to the server. The server at block 366 updates the record associated with the computer in the configuration catalogue accordingly. The process then ends at the concentric white/black stop circles 369.

However, the concepts of the present invention are also applicable when an equivalent method is performed, or when the process is aborted if a condition preventing its execution is detected (for example, because the process is launched on a computer that is not the server). Similar considerations apply if the space on the hard-disk of the server is checked before loading the images of the products to be installed, or if a mechanism is provided for restarting failed plans (skipping the actions already executed).

The same method is also applicable when a product must be upgraded (for example, by installing a patch). In this case, the patch is shipped with a corresponding new descriptor (including the reference model and the transition table); the descriptor specifies where the patch needs to be applied and how to do so. As described above, the process detects the current configuration of the computers, and proposes the actions to be carried out for aligning the network to the desired target configuration. As a further enhancement, the server automatically monitors the web site of the publisher; as soon as a new patch is made available, its application is enforced as described above.

More generally, the present invention proposes a method for use in a data processing system with a distributed architecture. The system includes a plurality of processing entities; each entity plays one or more predetermined roles in the system. The method of the invention is designed to configure the entities. The method starts with the step of defining a target configuration for each role. The roles of each entity are identified. Each entity is then configured according to the target configuration corresponding to the roles of the entity.

The solution of the invention makes it possible to configure the entities of the data processing system according to their roles.

As a consequence, the management of any configuration change in the system is strongly simplified.

The proposed mechanism is well suited to cover either the installation or the upgrading of distributed applications, and particularly applications including multiple products. For example, this method is suitable to address a scenario wherein the multi-product application is to be installed in a network wherein some products (possibly of a former version) have already been installed individually; advantageously, the solution of the invention is used to install a software infrastructure used to manage the life cycle of the whole system (even if different applications are contemplated and within the scope of the invention).

Moreover, the proposed method makes it possible to configure data processing systems with a complex topology in a very simple manner.

The preferred embodiment of the invention described above offers further advantages.

Particularly, the roles played by the computers include one or more physic roles.

This characteristic allows the definition of reference models, which are bound by an architecture of the network.

Advantageously, the physic role of each computer is retrieved from a memory structure set at the installation of the computer (either stored on the server or on the computer itself).

The proposed mechanism is very simple, but at the same time effective.

As a further enhancement, the network also supports one or more logic roles.

This additional feature strongly simplifies the configuration of applications requiring computers with different functions.

Preferably, the logic role of each computer is established according to the components (or other equivalent software features) installed on the same.

The devised mechanism is very flexible, and it can be adapted dynamically to the different application requirements.

Alternatively, the method only supports physic roles, the physic role of every computer is identified in a different manner (for example, inspecting a directory specifying a topology of the network), the method only supports logic roles, the logic role of every computer is identified in another way (for example, retrieving the information from a register that is set at the installation of the application on the computer), or different roles are envisaged.

In an advantageous embodiment of the invention, a transition table is used to identify the actions required to reach each desired target state from each current state.

This feature makes it possible to automate the whole configuration process.

Preferably, the proposed method is used to install software products (each one provided with a respective reference model and a respective transition table).

The devised mechanism strongly simplifies the maintenance of the software products used in the network.

However, the method of the invention leads itself to be implemented even configuring each computer according to the desired target state in a different manner (for example, without detecting its current state by the server). Alternatively, the proposed method is used to manage different configuration features (such as the content of internal registers or the triggering of monitoring activities).

Advantageously, the solution according to the present invention is implemented with a computer program application, which is provided as a corresponding product stored on a suitable medium.

In a preferred embodiment, the method is performed under the control of the server.

This architecture makes it possible to manage the whole configuration process centrally from a single site.

Alternatively, the program application is pre-loaded onto the hard-disk, is sent to the server through the Internet, is broadcast, or more generally is provided in any other form directly loadable into the working memory of the server. However, the method according to the present invention leads itself to be carried out with an application having a different architecture (for example, implementing an adaptive model), or even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

The invention claimed is:

1. In a data processing system with a distributed architecture including a plurality of computers, each computer playing at least one of a plurality of predetermined roles in the data processing system, a method of configuring the computers comprising:
    defining a target configuration for each predetermined role based on a reference model for a software product, the reference model specifying for each predetermined role, components of the software product that are to be installed on a computer having the predetermined role, wherein the plurality of predetermined roles comprises one or more physical roles and one or more logical roles;
    defining, in a transition table data structure, for each current state/target state pair of each component of the software product, an identifier of one or more actions required to reach the target state from the current state;
    identifying, for a computer in the plurality of computers, a physical role corresponding to the computer, the physical role identifying at least one function the computer plays within the distributed architecture of the data processing system and being defined based on the computer's position within the distributed architecture and a relationship between the computer and other computers in the plurality of computers;
    identifying, for the computer in the plurality of computers, at least one logical role, defined by a software configuration of the computer; and
    configuring the computer according to the target configuration corresponding to the physical role and the at least one logical role of the computer based on the current state/target state pairs in the transition table data structure.

2. The method according to claim 1, wherein an indication of a physical role of each computer in the plurality of computers is stored in a memory structure at an installation of the computers in the data processing system, and wherein identifying the physical role of the computer comprises retrieving an indication of a corresponding physical role from the memory structure.

3. The method according to claim 1, wherein a software application includes a plurality of software features, each logic role in the at least one logic role is associated with a corresponding software feature, and wherein identifying the at least one logical role of the computer comprises:
    detecting a software feature of the software application installed on the computer; and
    establishing a logical role of the computer according to the installed software feature.

4. The method according to claim 1, wherein configuring the computer according to the target configuration comprises:
    detecting a current configuration of the computer;

identifying at least one action required to reach the target configuration from the current configuration; and executing the at least one action on the computer.

5. The method according to claim 4, further comprising:

providing a software product including a plurality of components;

associating a reference structure with the software product, the reference structure defining a target configuration for each physical role and logical role, specifying at least one component to be installed; and associating a transition structure with the software product, wherein for each current configuration, the transition structure identifies the at least one action required to reach a target configuration corresponding to the physical role and one or more logical roles of the current configuration.

6. The method of claim 1, wherein the transition table data structure comprises an error code for a current state/target state pair in which a transition from the current state to the target state is not supported.

7. The method of claim 1, wherein an indication of the physical role of the computer is stored in a memory structure of the computer at an installation of the computer in the data processing system, and identifying the physical role of the computer comprises retrieving the indication of the corresponding physical role from the memory structure.

8. The method of claim 1, wherein the physical role corresponding to the computer is set at a time of installation of the computer in the distributed architecture and is stored in a configuration catalogue of a server in the distributed architecture, and wherein the configuration catalogue stores, for each computer in the distributed architecture, a name of a corresponding physical role of the computer and an inventory of software components installed on the computer.

9. The method of claim 1, wherein the at least one logical role is dynamic and changes as changes in the software configuration of the computer are made.

10. A computer program product comprising a non-transitory computer recordable medium having a computer readable program recorded thereon, wherein the computer readable program, when executed on a computing device, causes the computing device to define a target configuration for each of a plurality of predetermined roles based on a reference model for a software product, the reference model specifying for each predetermined role, components of the software product that are to be installed on a computer having the predetermined role, wherein the plurality of predetermined roles comprises one or more physical roles and one or more logical roles;

define, in a transition table data structure, for each current state/target state pair of each component of the software product, an identifier of one or more actions required to reach the target state from the current state;

identify, for a computer in the plurality of computers, a physical role corresponding to the computer, the physical role identifying at least one function the computer plays within the distributed architecture of a data processing system and being defined based on the computer's position within the distributed architecture and a relationship between the computer and other computers in the plurality of computers;

identify, for the computer in the plurality of computers, at least one logical role, defined by a software configuration of the computer; and configure the computer according to a target configuration corresponding to the physical role and the at least one logical role of the computer based on the current state/target state pairs in the transition table data structure.

11. The computer program product according to claim 10, wherein an indication of a physical role of each computer in the plurality of computers is stored in a memory structure at an installation of the computer in the data processing system, and wherein the computer readable program causes the computing device to identify the physical role of the computer by retrieving an indication of a corresponding physical role from the memory structure.

12. The computer program product according to claim 10, wherein a software application includes a plurality of software features, each logic role in the at least one logic role is associated with a corresponding software feature, and wherein the computer readable program causes the computing device to identify the at least one logical role of the computer by:

detecting a software feature of the software application installed on the computer; and establishing a logical role of the computer according to the installed software feature.

13. The computer program product according to claim 10, wherein the computer readable program causes the computing device to configure the computer according to the target configuration by:

detecting a current configuration of the computer;

identifying at least one action required to reach the target configuration from the current configuration; and executing the at least one action on the computer.

14. The computer program product according to claim 13, wherein the computer readable program further causes the computing device to:

provide a software product including a plurality of components;

associate a reference structure with the software product, the reference structure defining a target configuration for each physical role and logical role, specifying at least one component to be installed; and associate a transition structure with the software product, wherein for each current configuration, the transition structure identifies the at least one action required to reach a target configuration corresponding to the physical role and one or more logical roles of the current configuration.

15. The computer program product of claim 10, wherein the transition table data structure comprises an error code for a current state/target state pair in which a transition from the current state to the target state is not supported.

16. The computer program product of claim 10, wherein an indication of the physical role of the computer is stored in a memory structure of the computer at an installation of the computer in the data processing system, and identifying the physical role of the computer comprises retrieving the indication of the corresponding physical role from the memory structure.

17. An apparatus, comprising:

a processor; and a memory coupled to the processor, wherein the memory comprises instructions which, when executed by the processor, cause the processor to:

define a target configuration for each of a plurality of predetermined roles based on a reference model for a software product, the reference model specifying for each predetermined role, components of the software product that are to be installed on a computer having the predetermined role, wherein the plurality of predetermined roles comprises one or more physical roles and one or more logical roles;

define, in a transition table data structure, for each current state/target state pair of each component of the software product, an identifier of one or more actions required to reach the target state from the current state;

identify, for a computer in the plurality of computers, a physical role corresponding to the computer, the physical role identifying at least one function the computer plays within the distributed architecture of a data processing system and being defined based on the computer's position within the distributed architecture and a relationship between the computer and other computers in the plurality of computers;

identify, for the computer in the plurality of computers, at least one logical role, defined by a software configuration of the computer; and configure the computer according to a target configuration corresponding to the physical role and the at least one logical role of the computer based on the current state/target state pairs in the transition table data structure.

18. The apparatus according to claim 17, wherein an indication of a physical role of each computer in the plurality of computers is stored in a memory structure at an installation of the computers in the data processing system, and wherein the computer readable program causes the computing device to identify the physical role of the computer by retrieving an indication of a corresponding physical role from the memory structure.

19. The apparatus according to claim 17, wherein a software application includes a plurality of software features, each logic role in the at least one logic role is associated with a corresponding software feature, and wherein the computer readable program causes the computing device to identify the at least one logical role of the computer by:
    detecting a software feature of the software application installed on the computer; and
    establishing a logical role of the computer according to the installed software feature.

20. The apparatus according to claim 17, wherein the computer readable program causes the computing device to configure the computer according to the target configuration by:
    detecting a current configuration of the computer;
    identifying at least one action required to reach the target configuration from the current configuration; and
    executing the at least one action on the computer.

21. The apparatus according to claim 20, wherein the computer readable program further causes the computing device to:
    provide a software product including a plurality of components;
    associate a reference structure with the software product, the reference structure defining a target configuration for each physical role and logical role, specifying at least one component to be installed; and
    associate a transition structure with the software product, wherein for each current configuration, the transition structure identifies the at least one action required to reach a target configuration corresponding to the physical role and one or more logical roles of the current configuration.

22. The apparatus of claim 17, wherein an indication of the physical role of the computer is stored in a memory structure of the computer at an installation of the computer in the data processing system, and identifying the physical role of the computer comprises retrieving the indication of the corresponding physical role from the memory structure.

* * * * *